United States Patent [19]
Kaihori et al.

[11] Patent Number: 5,687,295
[45] Date of Patent: Nov. 11, 1997

[54] JOG FEED INFORMATION DISPLAY APPARATUS FOR A ROBOT

[75] Inventors: Hirotsugu Kaihori; Takayuki Ito; Atsushi Watanabe, all of Oshino-mura, Japan

[73] Assignee: Fanuc Ltd., Yamanashi, Japan

[21] Appl. No.: 426,114

[22] Filed: Apr. 20, 1995

[30] Foreign Application Priority Data

Apr. 28, 1994 [JP] Japan .................. 6-111670

[51] Int. Cl.⁶ .................................. B25J 3/00
[52] U.S. Cl. .................................. 395/99
[58] Field of Search .............. 395/86, 99; 901/3; 318/568.13; 364/167.01

[56] References Cited

U.S. PATENT DOCUMENTS

| | | | |
|---|---|---|---|
| 5,047,700 | 9/1991 | Szakaly | 395/99 |
| 5,047,916 | 9/1991 | Kondo | 395/99 |
| 5,053,975 | 10/1991 | Tsuchihashi et al. | 395/99 |
| 5,231,693 | 7/1993 | Backes et al. | 395/99 |
| 5,341,459 | 8/1994 | Backes | 395/99 |
| 5,404,290 | 4/1995 | Tsuchihashi et al. | 395/99 |
| 5,410,638 | 4/1995 | Colgate et al. | 395/99 |
| 5,485,552 | 1/1996 | Mizuno et al. | 395/99 |
| 5,511,147 | 4/1996 | Abdel-Malek | 395/99 |

*Primary Examiner*—Robert W. Downs
*Attorney, Agent, or Firm*—Staas & Halsey

[57] ABSTRACT

When an operator selects one of many jog modes, including a tool feed mode, robot coordinate system feed mode, user coordinate system feed mode, joint feed mode, etc., a display controller displays a jog feed direction adapted for the selected mode for superposition on a robot image on a monitor screen. If the operator depresses any of jog feed direction selector keys, the jog feed direction corresponding to the depressed key is displayed for discrimination.

12 Claims, 4 Drawing Sheets

JOG FEED INFORMATION DISPLAY APPARATUS FOR A ROBOT

BACKGROUND OF THE INVENTION

1. Field of the Invention The present invention relates to an apparatus for displaying jog feed information for a robot, to be used for teaching an industrial robot (hereinafter referred to simply as "robot") which is operated by a teaching-playback method.

2. Description of the Related Art

In executing various operations by utilizing a system which includes a robot, the robot must be subjected to position teaching ("position teaching" includes "posture teaching" in the following) so that it may behave accurately in compliance with intended contents of work. The so-called off-line teaching is utilized in order to lighten an operator's work load required by this teaching operation.

It is generally known that this off-line teaching system is very effective in the case where accurate data for an object of work, such as a workpiece, and work environment are provided in advance, and the contents of work are so simple that robot position does not require a very high accuracy.

In many cases, however, it is hard completely to settle robot position only in accordance with the data provided at the time of off-line teaching. Accordingly, the so-called teaching-playback system is utilized frequently. According to this system, the operator carries out final position teaching while actually moving the robot by manual operation on the scene of work. This system also applies to the case where the off-line teaching is already executed.

In order to meet this requirement in the main, most robot control devices have a jog feed function such that the robot position is gradually changed by manual operation. Normally, jog feed is carried out in a manner such that the robot is translated in an assigned direction (positive or negative direction) along an assigned coordinate axis (X-, Y-, or Z-axis or first, second, or third axis) of an assigned coordinate system of the robot or rotated in an assigned direction (positive or negative direction W, P or R) around an assigned coordinate axis of an assigned coordinate system.

In executing a jog feed operation, the operator operates a keyboard of a teaching control panel of the robot control device, thereby selecting and assigning a reference coordinate system (world coordinate system, user coordinate system, etc.) which is believed to be best suited for the contents of work, or confirming the already assigned contents. This is referred to as assignment of a jog mode. If the operator selectively depresses one of jog keys indicated by X+, X−, Y+, Y−, Z+, Z−, α+, α−, β+, β−, γ+, γ−, etc. with the jog mode assigned in this manner, the robot starts translation or rotation correspondingly. The translation or rotation is adjusted by changing the time of duration or repetition cycles of depression of the jog key. Besides the system using these jog keys, there is a system which uses a joy stick.

Generally, the selection of the reference coordinate system for jog feed is referred to as jog mode assignment. If the operator mistakes the actually assigned log mode for another in executing the jog feed, due to a failure to change the log mode, the robot moves in an unexpected direction, thereby lowering the operating efficiency, and in some cases, causing an interference or accident resulting in injury.

Conventionally, a log mode to be executed or in execution is displayed only in a simple form, e.g., in characters. Therefore, the operator is liable to execute log feed continuously without being aware of the failure to change the log mode, misassignment, etc. Even in the case where the log mode is assigned correctly, the operator cannot easily grasp the expectable or real-time jog feed direction in the form of an image, and therefore, cannot forward the work without a feeling of uneasiness.

SUMMARY OF THE INVENTION

The object of the present invention is to provide a jog feed information display apparatus for a robot, whereby an operator can grasp the expectable or real-time jog feed direction in the form of an image so that he can execute jog feed operation without a feeling of uneasiness, and that the jog feed operation can be prevented from being executed or continued in a mistaken jog mode.

The following is a description of an outline of the present invention.

When the operator assigns (changes or confirms) the jog mode by operating a keyboard of a teaching control panel of a robot control device, the substance of the jog mode assignment, along with an image representing a robot, is graphically displayed on a screen of a jog feed information display apparatus. By observing the image of the robot, the operator can immediately recognize the relative postures of the robot and coordinate axes of a reference coordinate system selected through the assignment of the jog mode.

Since the operator's sense of direction varies depending on the assigned jog mode, it is believed that the form of the robot image convenient to the operator also varies.

In a tool feed mode based on a tool coordinate system, for example, the operator's consciousness may be supposed to center around the tool center point of a robot arm. Preferably, therefore, the robot image to be displayed should be a graphic image which briefly represents an area around the tool center point of the robot arm. More specifically, the robot arm end should be displayed with a hand thereon, and images of individual axes of the tool coordinate system should be superposed on the graphic image, in order to make the sense of direction clear.

In a robot coordinate system feed mode based on a base coordinate system of the robot, on the other hand, the operator may be supposed to be conscious of the whole robot centering around the robot base. Preferably, therefore, the robot image to be displayed should be a graphic image which briefly represents the whole robot, and images of individual axes of the base coordinate system should be superposed on the base of the robot (near the origin of the base coordinate system).

Likewise, in a user coordinate system feed mode, the graphic image which briefly represents the whole robot and images of individual axes in alignment with set positions in the user coordinate system should preferably be superposed as they are displayed.

In a joint feed mode, moreover, an image which indicates the position of each axis and the direction of movement (translation or rotation) should preferably be superposed on the entire robot image.

The operator can enjoy better convenience if he can make an additional display by selectively depressing one of jog keys indicated by X+, X−, Y+, Y−, Z+, Z−, α+, α−, β+, β−, γ+, γ−, etc. with the jog mode assigned. For example, the apparatus may be arranged so that X-axis display elements are flickered or discriminated by color when the key X+ is depressed, and that display elements around the Y-axis are flickered or discriminated by color when the key β– is depressed. According to this arrangement, the jog feed state can be visually observed and grasped by the level of the actually selected jog feed direction.

DETAILED DESCRIPTION OF THE PREFERRED EMBODIMENT

Figure 1:
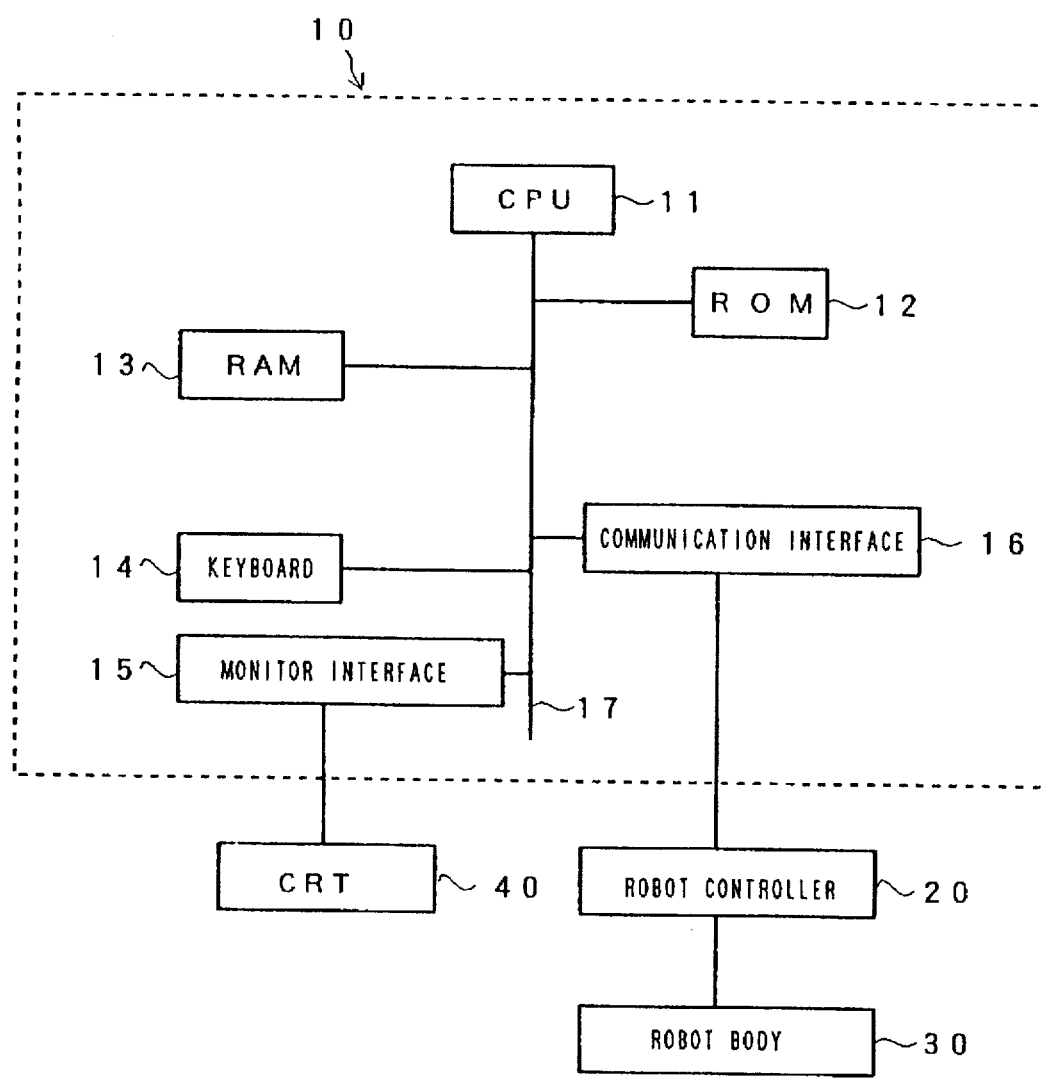
FIG. 1 As a block diagram showing the principal part of a robot control system which incorporates a jog feed information display apparatus according to the present invention.

FIG. 1 is a block diagram showing the principal part of a robot control system which incorporates a jog feed information display apparatus according to the present invention.

Figure 2:
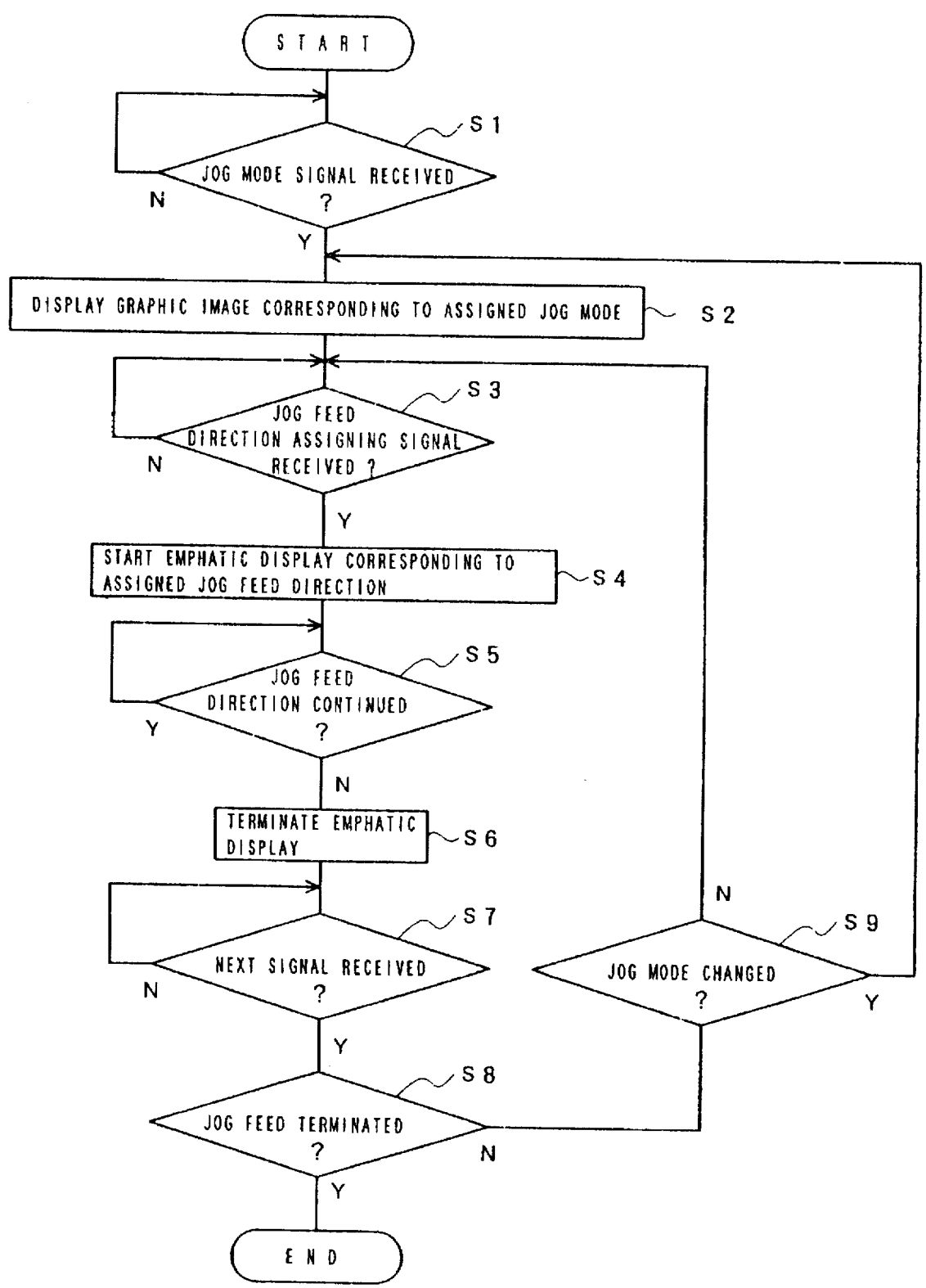
FIG. 2 is a flowchart showing an outline of a jog feed information display process executed by a CPU of a display controller.

FIG. 2 is a flowchart showing an outline of a process for displaying a graphic image on a CRT monitor screen. FIGS. 3 to 6 are diagrams schematically showing several examples of graphic images displayed on the CRT monitor screen during teaching operation. Referring now to FIGS. 1 to 6, an embodiment of the present invention will be described in detail.

Referring first to FIG. 1, the system generally comprises a display controller 10, a robot controller 20, a body 30 of a robot controlled by means of the robot controller 20, and a CRT monitor 40 for use as a display device for displaying jog feed information (display device type is optional, in general).

The display controller 10 includes a central processing unit (hereinafter referred to as CPU) 11, which is connected, by means of a bus 17, with a memory 12 formed of a ROM, a memory 13 formed of a RAM, a keyboard 14, a monitor interface 15 connected to the CRT 40 for displaying graphic images, and a communication interface 16 used to transmit and receive signals associated with jog feed operation to and from the robot controller 20.

The ROM 12 and the RAM 13 are previously loaded with programs, associated image data, set data, etc. for executing a jog feed information display process (see FIG. 6) in accordance with the jog feed signals delivered from the robot controller 20, along with programs for controlling the whole system.

The robot controller 20 may be of a conventional type in which memories formed of a ROM and a RAM, a teaching control panel, an axis controller connected to the robot body 30 through a servo circuit, and a communication interface are connected by means of a bus. The control panel is provided with a jog feed start command key, jog mode selector keys, jog feed direction selector keys (selector keys X+, X–, Y+, Y–, Z+, Z–, α+, α–, β+, β–, γ+, γ–; θ1+, θ1–, ... θ6+, θ6–, etc.). Here θ1+, θ1–, ... represent modes in which various axes of the robot are rotated or translated. An amount of jog feed (amount of translation or rotation) can be adjusted depending upon the time of duration or repetition frequency of depression of each jog key. The robot controller using these jog keys may be replaced with one having its joy stick based on the jog feed system.

FIG. 2 shows an example of the outline of the process for jog display executed by the CPU 11. This process will be described on the assumption that preliminary operations for the input of necessary programs, settlement of various coordinate systems, image data input, etc. are all completed. It is assumed in this process that jog modes that may be assigned are;

(1) a tool feed mode based on a tool coordinate system;

(2) a base coordinate system feed mode based on a base coordinate system of the robot;

(3) a user coordinate system feed mode based on a user coordinate system set on a workpiece as an object of operation; and (4) a joint feed mode in which various axes of the robot are allowed to be jogged for rotation or translation.

If an operator operates the teaching control panel of the robot controller 20 and depresses the jog feed start command key, the CPU 11 of the display controller 10 triggers a program for displaying process of jog feed information, thereby starting the process, and immediately enters a standby state for jog mode signal reception (Step S1).

If the operator further selects a jog mode adapted for the contents of work, from among other jog modes, and depresses a corresponding jog mode selector key (or confirmation key), the robot controller 20 gets ready for jog feed operation and transmits a signal indicative of the selected jog mode to the display controller 10.

The CPU 11 of the display controller 10 receives the jog mode signal (YES in Step S1), immediately reads graphic image data adapted for the assignment of the jog mode from the memory, and causes the CRT 40 to display a graphic image on its screen through the monitor interface 15 (Step SZ).

The contents of display vary in the following manner, depending on which is selected from among the aforementioned jog modes (1), (2), (3) and (4).

Figure 3:
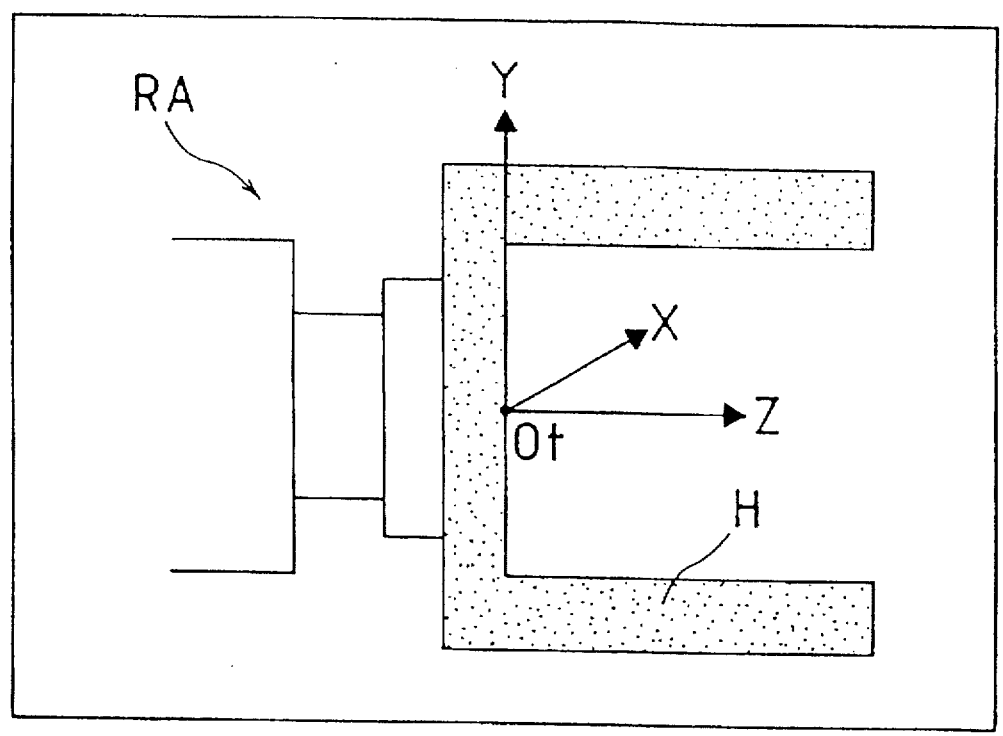
FIG. 3 is a diagram showing an example of a graphic image displayed on a CRT monitor screen during jog feed operation in a tool feed mode.

(1) Tool feed mode: In this mode, a tool center point of the robot is moved on the basis of the tool coordinate system. As shown in FIG. 3, therefore, each axis image Ot-XYZ of the tool coordinate system is superposed on a graphic image which briefly represents a region RA near a tool center point of a robot along with a hand H.

Figure 4:
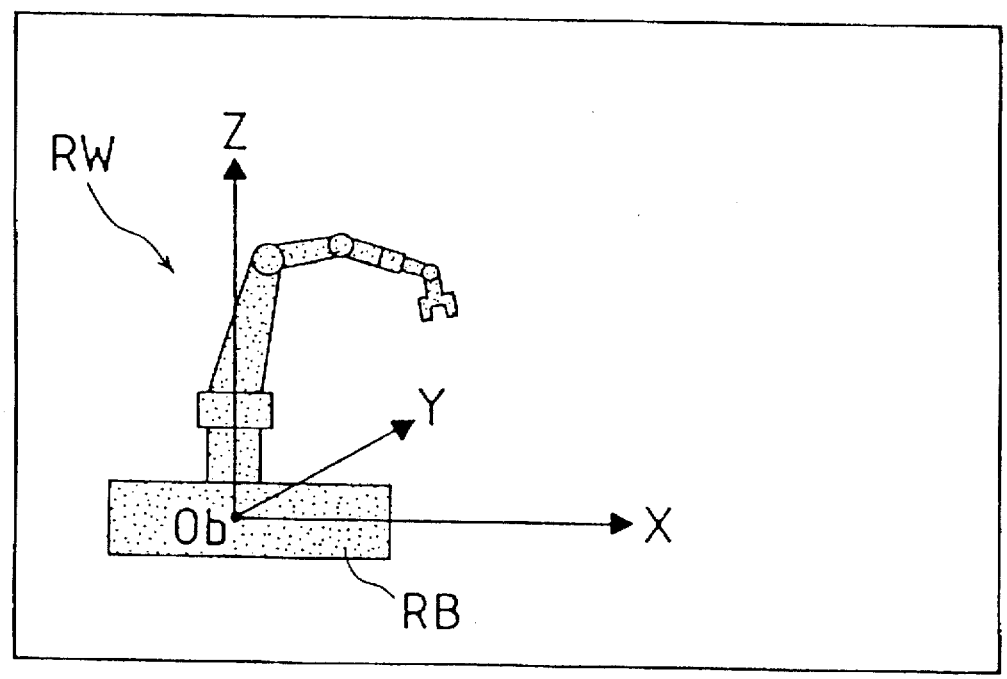
FIG. 4 is a diagram showing an example of a graphic image displayed on the CRT monitor screen during jog feed operation in a robot coordinate system feed mode.

(2) Robot coordinate system feed mode: In this mode, the tool center point of the robot is moved on the basis of the base coordinate system which is fixed to a robot base RB. As shown in FIG. 4, therefore, each axis image Ob-XYZ of the base coordinate system is displayed on a graphic image which briefly represents an entire robot image RW including the robot base RB.

Figure 5:
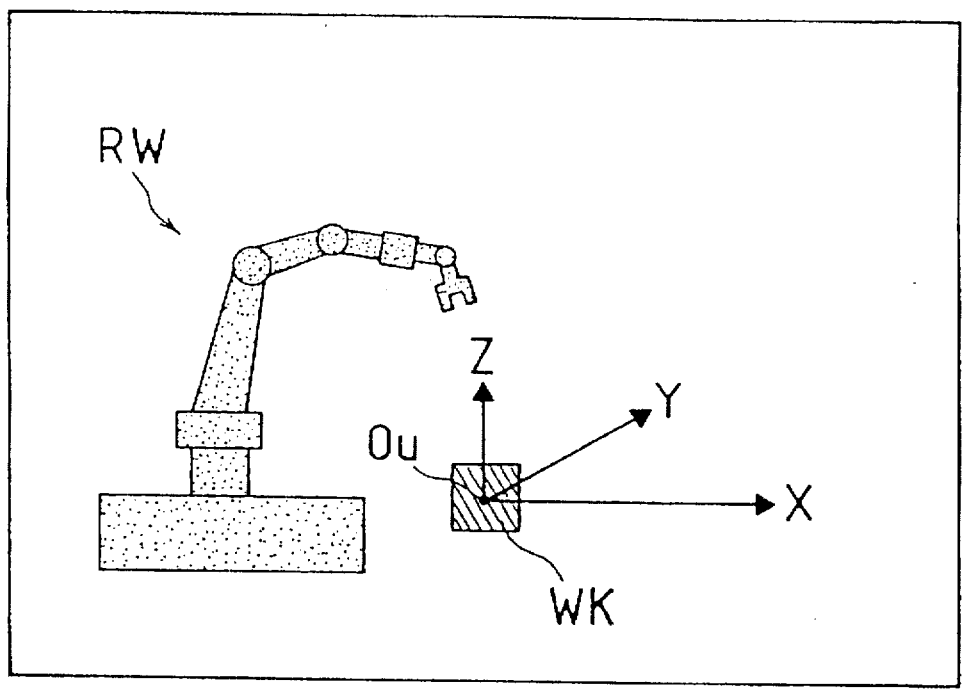
FIG. 5 is a diagram showing an example of a graphic image displayed on the CRT monitor screen during jog feed operation in a user coordinate system feed mode.

(3) User coordinate system feed mode: In this mode, the tool center point of the robot is moved on the basis of the coordinate system which is set in a position (e.g., on the workpiece) separate from the robot. As shown in FIG. 5, therefore, each axis image Ou-XYZ of the user coordinate system is displayed on the graphic image which briefly represents the entire robot image RW.

Figure 6:
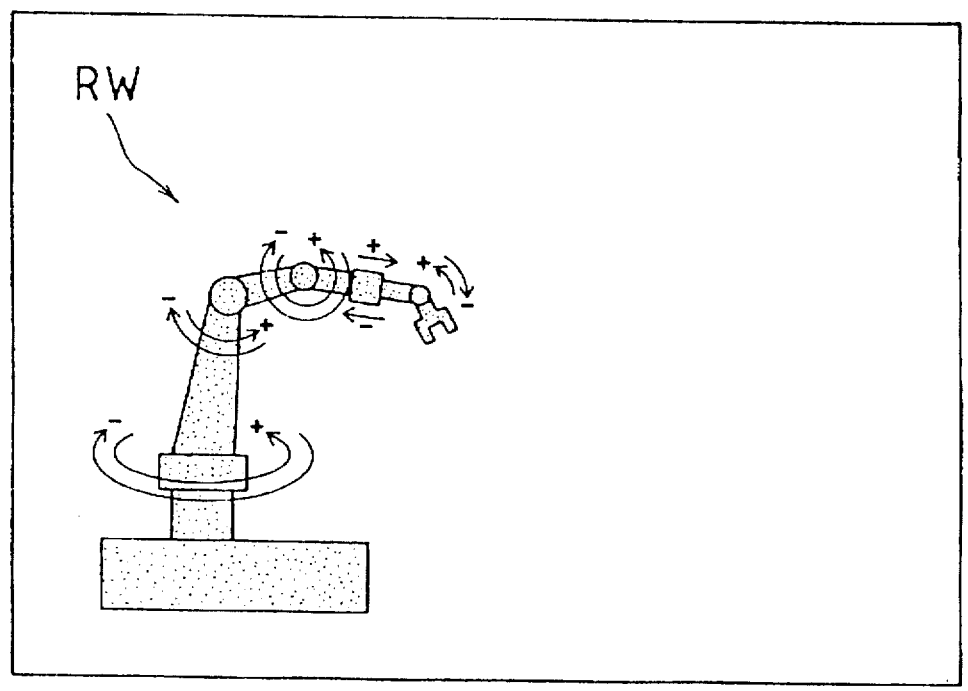
FIG. 6 is a diagram showing an example of a graphic image displayed on the CRT monitor screen during jog feed operation in a joint feed mode.

(4) Joint feed mode: In this mode, each axis of the robot is rotated or translated in a positive or negative direction. As shown in FIG. 6, therefore, an image for indicating the position and direction of movement (rotation or translation) of each axis is superposed on the entire robot image RW.

In Step S3 which directly follows Step S2, the CPU 11 gets ready to receive a signal indicative of the depression of one of the jog feed direction selector keys (X+, X−, Y+, Y−, Z+, Z−, α+, α−, β+, β−, γ+, γ−; θ1+, θ1−, ... θ6+, θ6−, etc.) (or assignment by means of the joy stick).

If the operator depresses any of the jog feed direction selector keys, the robot controller 20 jogs the robot body 30, and at the same time, transmits the signal indicative of the depressed jog key (or jog feed direction assigned by means of the joy stick) to the display controller 10.

The CPU 11 of the display controller 10 receives this jog feed direction assigning signal (YES in Step S3), and starts an emphatic display indicative of the assigned jog feed direction in the graphic image already displayed on the screen of the CRT 40 through the monitor interface 15 (Step S4). The emphatic display may be made by various methods, such as flickering the coordinate axis concerned, changing the display color of the coordinate axis concerned, etc. The joint feed mode or the like can be executed more effectively with an emphatic display of an arrow which is indicative of the positive or negative direction.

This state is continued until a signal indicative of the interruption of jog feed in the direction concerned (e.g., interruption of the depression of the jog key concerned) is transmitted from the robot controller 20 (Step S5). When the signal indicative of the interruption of jog feed in the direction concerned is transmitted from the robot controller 20, the emphatic display is interrupted (Step S6).

Then, reception of a subsequent signal from the robot controller 20 is awaited (Step S7). In the case where the signal received by the display controller 10 is indicative of the termination of the jog feed itself (YES in Step S1), the jog feed information display process is finished (END). In the case where the received signal represents a jog mode change (reassignment) (YES in Step S9), the CPU 11 returns to Step S2, whereupon it displays a graphic image corresponding to the assigned jog mode. Subsequent processes are executed in the same manner as aforesaid.

In the case where the received signal indicates the continuation of the jog mode, that is, if a signal for assigning the jog feed direction (e.g., signal for the depression of any of the jog feed direction selector keys) is received without any jog mode change (reassignment), the CPU 11 advances to Step S4 after confirming the signal reception in Step S3, whereupon it makes an emphatic display. Subsequent processes are executed in the same manner as aforesaid.

According to the present embodiment, as described herein, the image indicative of the substance of the jog mode assigned on the robot control means, along with the image which represents the robot, is displayed on the screen of the display means which has a function to display graphic images. When the operator actually starts robot movement by jog feed, the direction of the movement is displayed emphatically, so that the operator's work load during teaching operation and the like can be lightened considerably.

According to the present invention, the operator can easily grasp the jog mode in the form of an image before or during the execution of the jog feed operation. Thus, the jog feed can be prevented from being started or continued with the jog mode mistaken for another.

Since directions of the jog feed of a mode currently assigned or directions of a jog feed in operation can be grasped in the form of an image, moreover, the jog feed operation can be executed without a feeling of uneasiness, and the efficiency of the teaching operation based on the jog feed operation can be improved.

Emphatically displaying the real-time jog feed direction in the graphic image, in particular, will enable an operator to grasp the jog feed direction more definitely.

What is claimed is:

1. A jog feed information display apparatus for a robot, comprising:
    display means for displaying a plurality of graphic images; and
    image displaying means for displaying on a screen of the display means a graphic image associated with a substance of a jog mode currently assigned by a robot controller, along with a graphic image associated with a whole or a principal part of a robot, in a manner such that a correlation between a posture of the robot and the jog mode is clearly illustrated, said jog mode being a coordinate system for said robot.

2. A jog feed information display apparatus for a robot, comprising:
    display means for displaying a plurality of graphic images;
    image displaying means for displaying on a screen of the display means a graphic image associated with a substance of a jog mode currently assigned by a robot controller, along with a graphic image associated with a whole or a principal part of a robot, in a manner such that a correlation between a posture of the robot and the jog mode is clearly illustrated, said jog mode being a coordinate system for said robot; and
    jog feed direction displaying means for displaying a direction of jog feed being currently executed on the screen in a manner such that the substance of the jog mode displayed on the screen is visually specified, said direction of jog feed being a direction of a movement of said robot with respect to an axis in said coordinate system.

3. A jog feed information display apparatus for a robot according to claim 1, wherein said image displaying means displays the origin and coordinate axes of a reference coordinate system assigned for jog feed on the screen of the display means, corresponding in position to the robot image displayed on the screen, so that the reference coordinate system can be definitely discriminated from other coordinate systems provided by the robot controller.

4. A jog feed information display apparatus for a robot according to claim 1, wherein said image displaying means displays a graphic image associated with a tool coordinate system on the screen, corresponding in posture to a graphic image associated with a tool center point of a robot arm, in the case where the substance of the jog mode currently assigned by the robot controller is the tool coordinate system.

5. A jog feed information display apparatus for a robot according to claim 1, wherein said image displaying means displays a graphic image associated with a base coordinate system of the robot on the screen, corresponding in posture to a graphic image associated with the whole robot, in the case where the substance of the jog mode currently assigned by the robot controller is the base coordinate system.

6. A jog feed information display apparatus for a robot according to claim 1, wherein said image displaying means displays a graphic image associated with a user coordinate system on the screen, corresponding in posture to a graphic image associated with the whole robot, in the case where the substance of the jog mode currently assigned by the robot controller is the user coordinate system.

7. A jog feed information display apparatus for a robot according to claim 1, wherein a graphic image associated with the whole robot is displayed on the screen in a manner such that the directions of rotation and translation of each axis of the robot are specified in the case where the substance of the jog mode currently assigned by the robot controller is a mode in which each axis is rotated or translated in a positive or negative direction.

8. A jog feed information display apparatus for a robot according to claim 2, wherein said image displaying means displays the origin and coordinate axes of a reference coordinate system assigned for jog feed on the screen of the display means, corresponding in position to the robot image displayed on the screen, so that the reference coordinate system can be definitely discriminated from other coordinate systems provided by the robot controller.

9. A jog feed information display apparatus for a robot according to claim 2, wherein said image displaying means displays a graphic image associated with a tool coordinate system on the screen, corresponding in posture to a graphic image associated with a tool center point of a robot arm, in the case where the substance of the jog mode currently assigned by the robot controller is the tool coordinate system.

10. A jog feed information display apparatus for a robot according to claim 2, wherein said image displaying means displays a graphic image associated with a base coordinate system of the robot on the screen, corresponding in posture to a graphic image associated with the whole robot, in the case where the substance of the jog mode currently assigned by the robot controller is the base coordinate system.

11. A jog feed information display apparatus for a robot according to claim 2, wherein said image displaying means displays a graphic image associated with a user coordinate system on the screen, corresponding in posture to a graphic image associated with the whole robot, in the case where the substance of the jog mode currently assigned by the robot controller is the user coordinate system.

12. A jog feed information display apparatus for a robot according to claim 2, wherein a graphic image associated with the whole robot is displayed on the screen in a manner such that the directions of rotation and translation of each axis of the robot are specified in the case where the substance of the jog mode currently assigned by the robot controller is a mode in which each axis is rotated or translated in a positive or negative direction.

* * * * *